United States Patent [19]

Romero et al.

[11] Patent Number: 5,117,348

[45] Date of Patent: May 26, 1992

[54] METHOD FOR ALIGNMENT OF A REPRESENTATIVE SURFACE TO AN ACTUAL SURFACE FOR A TAPE LAYING MACHINE

[75] Inventors: Jorge E. Romero; Robert C. Trank, both of Rockford, Ill.

[73] Assignee: The Ingersoll Milling Machine Company, Rockford, Ill.

[21] Appl. No.: 845,969

[22] Filed: Mar. 28, 1986

[51] Int. Cl.⁵ .............................................. G06F 15/00
[52] U.S. Cl. .............................. 364/167.01; 364/468; 156/350
[58] Field of Search ................ 364/167-171, 364/474, 475, 513, 468, 167.01; 156/64, 350, 378

[56] References Cited

U.S. PATENT DOCUMENTS

| | | | |
|---|---|---|---|
| 3,920,972 | 11/1975 | Corwin, Jr. et al. | 364/513 |
| 3,986,007 | 10/1976 | Ruoff, Jr. | 364/300 |
| 4,134,681 | 1/1979 | Elmer | 364/456 |
| 4,156,835 | 5/1979 | Whitney et al. | 364/513 |
| 4,370,720 | 1/1983 | Hyatt | 364/171 |
| 4,456,961 | 6/1984 | Price et al. | 364/513 |
| 4,495,588 | 1/1985 | Nio et al. | 364/192 |
| 4,575,802 | 3/1986 | Walsh et al. | 364/191 |
| 4,580,229 | 4/1986 | Koyama et al. | 364/513 |
| 4,639,878 | 1/1987 | Day et al. | 364/513 |
| 4,696,707 | 9/1987 | Lewis et al. | 364/169 |

Primary Examiner—Allen R. MacDonald
Attorney, Agent, or Firm—Fitch, Even, Tabin & Flannery

[57] ABSTRACT

A method and apparatus for aligning an actual surface with the internal coordinate system of a machine working thereon is disclosed. A part program controls the motions of a tape laying machine for depositing composite tape on the surface of a mandrel marked with a plurality of reference points. A probe assembly is attached to the tape laying head of the machine and can be used to measure the coordinates of the reference points on the mandrel surface relative to the internal coordinate system of the machine. These measurements and corresponding points on a representative surface permit a transformation function to be generated based upon the rotation and translation of one surface with respect to the other. The geometric data of instructions of the part program are transformed from their orientation relative to the reference surface to a new orientation relative to the mandrel surface by the transformation function before being applied to the tape laying machine.

7 Claims, 9 Drawing Sheets

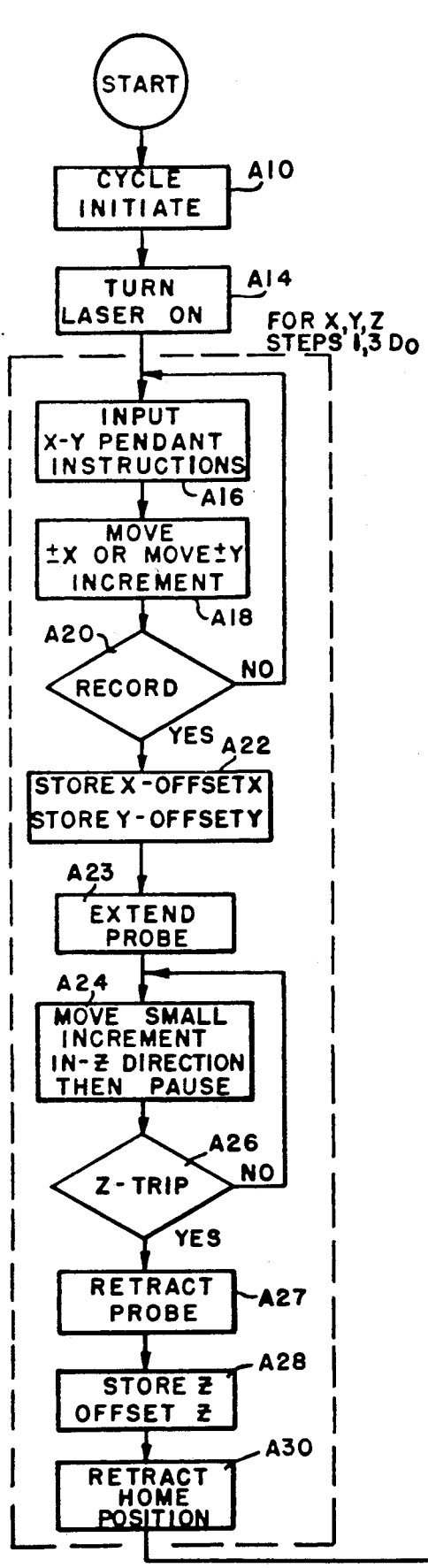
FIG. 14
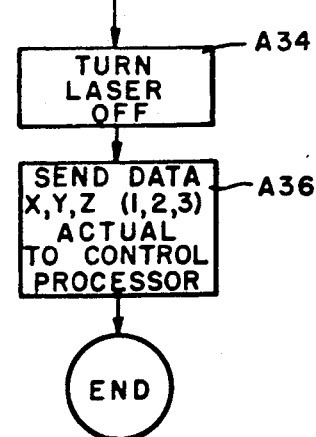
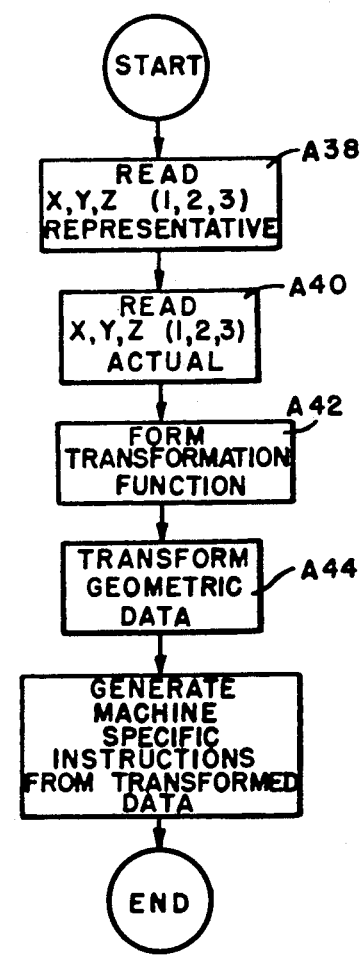
FIG. 15

METHOD FOR ALIGNMENT OF A REPRESENTATIVE SURFACE TO AN ACTUAL SURFACE FOR A TAPE LAYING MACHINE

The invention pertains generally to the alignment of a workpiece and a machine which move relative to one another according to a part program, and is more particularly directed to the alignment of an actual surface of compound curvature with respect to the internal coordinate system of a tape laying machine preprogrammed with a part program for the deposition of composite tape upon the actual surface.

BACKGROUND OF THE INVENTION

In the context of this invention, the term "composite" describes a material consisting essentially of high strength fibers or filaments of graphite, or other material, embedded in a matrix of a thermosetting resin which serves when cured to maintain the alignment of the fibers and their relationship to one another within the matrix as the material is stressed. As applied to the construction of aerodynamic surfaces, composite material has heretofore taken the form of woven mats preimpregnated with resin and, more recently, resin tapes embedded with fibers or filaments aligned in the longitudinal direction of the tape, multiple courses of which are laid side-by-side to construct one ply or layer of a manufactured article which is then constructed incrementally of successive layers of tape.

The application of these construction techniques to contoured surfaces heretofore has been essentially one of first laying up the laminated structure on a flat surface and then transferring or pressing the layup into a mold having the final contour of the part to be fabricated so that the layup will assume the desired shape. The mold with the composite layup applied thereto is then autoclaved. The layers of resinous matrix material merge into a unitary structure during the initial stages of the process and then solidify upon continued exposure to the high temperature in the autoclave as the resin cures.

The described system poses a number of problems in the molding of surfaces of compound curvature i.e., those curved in multiple planes or on multiple axes. One problem is conforming a plane-table layup to the compound surface of a mold and this problem becomes more prominent with the severity of the curvature encountered. In all cases, irrespective of curvature, the mere necessity of transferring the layup from a flat lay surface to a mold and pressing it into conformity with the mold surface is a labor-intensive and time-consuming operation.

It is accordingly desirable from the standpoint of manufacturing efficiency and the integrity of the final product to form the laminated layup with composite tape layed directly upon the compound surface of an appropriately shaped tool or mandrel. This is preferably done with composite tape to make the most efficient use of the strength of the fibrous material, as well as to conform the essentially planar form of the building material more readily to the compound curvature of the mandrel. Such conformance is much more easily accomplished with composite tape than by the use of broad goods.

Even with composite tape, however, the practical necessity of working with tapes of finite widths in the range of from 1 to 6 inches and thicknesses of about 0.0055 to 0.010 inches, and the essential inelasticity of the fiber core of the tape under laying conditions, create their own problems. The primary difficulty is conforming the composite tape to the compound surface without puckering one edge or the other of the tape as the tape laying mechanism follows, within limits, the curvature of the lay surface on any selected tape course.

To overcome this problem, it has been proposed, as disclosed in co-pending application Ser. No. 794,172 by Lewis et al., now U.S. Pat. No. 4,696,707 which is commonly assigned with this invention, that any given lay surface first be defined mathematically with respect to the tape laying machine coordinate system, and that the tape be applied to such a surface by following a preprogrammed natural path of the tape thereon while conforming as nearly as possible to the direction in which the designer would prefer to have the fibers aligned for the sake of the strength of the part. By the technique disclosed in Lewis et al., the path of each successive course within a ply, and each successive ply in the layup of the laminated article, is predetermined such that the machine is programmed to lay the tape without tensioning the tape edges unequally. This avoids the puckering of the tape along either of its edges as would inevitably happen if the laying mechanism sought to steer the tape forcibly to any substantial degree away from its natural path.

To rapidly and accurately generate a natural tape path for a part program, the programmed machine of Lewis et al. uses a mathematical description of the lay surface on the workpiece area of a mandrel forming the complex contoured shape. This mathematical description of the lay surface describes the shape and contours of the mandrel in terms of various Z-axis heights or offsets from a control plane broken into convenient X-Y areas. Because it is the tape laying head of the machine which is to be moved, the X-Y areas of the control plane are referenced not to the actual coordinates in space of the surface of the mandrel but to the internal coordinate system of the tape laying machine. Therefore, there is at least one area of concern in laying tape precisely on the mandrel which must be addressed to enhance the rapid manufacture of parts in this manner.

The mandrel surface may be out of alignment with the machine coordinate system. The part program assumes the actual mandrel surface is oriented to the internal coordinate system of the tape laying machine in the same manner as the mathematical representation. The reason for any discrepancy is that the mandrels used in laying up large parts for the aircraft industry are relatively expansive and bulky, and further are many times assembled in sections. After a part is layed up, the mandrel with the semi-cured composite tape thereon is moved to the autoclave for curing. To not interrupt the production process, another mandrel is brought into place and aligned in the same orientation with the tape laying machine as the other as quickly as possible. However, to manually align an object as large as a surface used for a wing skin to the precision necessary for maximum accuracy of the tape laying machine is extremely time consuming.

A relatively accurate alignment can be made quickly by manual positioning but it is the final adjustment process which requires most of the time. During the time an operator of a tape laying machine is positioning a mandrel to correct the alignment, no tape is being deposited on the mandrel surface and such time is wasted overhead in the production process. What is necessary is a rapid method of aligning relatively large mandrels. or for that matter any large tool or workpiece. to the same coordinate system as the machine working on them so that the process can be run with precision.

SUMMARY OF THE INVENTION

The invention provides a method and apparatus for aligning an actual surface or coordinate system of a workpiece or tool with the coordinate system of the machine working on it so that relative movement between the tool or workpiece and machine as defined by a part program is accurately controlled. The invention is shown to advantage in a preferred embodiment which is used for aligning the actual surface of a mandrel of a composite tape laying machine to the internal coordinate system of the machine.

The tape laying machine has a multi-axis tape laying head for depositing multiple courses of composite tape side by side upon a mandrel with a complex receiving surface of compound contour. Multiple adjacent courses of tape define a ply or layer upon the lay surface. and a laminated structure of compound contour is built up from a succession of such plies, each laid upon the previous one.

Each tape course of a ply is laid by moving the tape laying head of the machine along a preprogrammed path. The course is controlled from the machine instructions of a part program generated from surface defining orthogonal coordinates supplied to a path generator processor. The coordinates define the surface of the mandrel by a mathematical representation which is used by the path generator processor in conjunction with systems criteria, such as natural path restrictions, to generate tape course data. The tape course data is combined with other machine instructions in a part program and used to command movement of the tape laying head along the path.

The part program is transformed by a transformation function in a control processor prior to being used to command movements of the tape laying head. The transformation function translates and rotates the geometric data of the part program referenced to the orientation of the representative surface to the orientation of the actual surface of the mandrel. The transformation can be accomplished for the entire program producing a new program referenced to the actual orientation of the mandrel or can be accomplished on a point by point basis as a part program is being executed.

The transformation function is derived by selecting a plurality of points on the surface of the mandrel as reference points and measuring their coordinates relative to the internal coordinate system of the tape laying machine. The corresponding points of the representative surface are then selected for comparison. Preferably, three points defining a plane for each surface are selected and a transformation matrix derived to determine the rotation needed to align the orientation of the representative plane to the actual plane. The transformation matrix is generated by forming two orthonormal triads of unit vectors representative of orientation of each surface and solving a matrix equation relating one triad as a function of the other. The solution of the matrix equation is the transformation matrix relating the orientation of one orthonormal triad, and hence representative surface, to the other orthonormal triad and actual surface.

Points in the part program relative to the representative surface are then transformed by operation of the transformation matrix to an orientation relative to the actual surface. Because a point in the part program is referenced to the origin of the internal coordinate system of the tape laying machine. it must first be translated to the origin of the representative triad, rotated, and then retranslated to the tape laying machine origin. This operation is accomplished by subtracting a point used as the origin of the unit vector triad, performing the rotation or matrix transformation, and then adding the point back again.

The measurements of the selected points of the mandrel surface to determine the actual orientation are made by a probe assembly attached to the tape laying head. The probe assembly comprises a vertically mounted source of visible light which can be focused into a narrow beam and utilized as a tracer beam to incrementally move the tape laying head until it is displaced directly above one of the reference points. The probe assembly further includes an elongated probe which can be lowered by moving the tape laying head until it lands on a selected point and generates a signal to the controller that the landing has occurred. Preferably, the probe is adapted to be retracted and extended as needed for measurement purposes.

The tape laying head of the machine includes a plurality of position feedback sensors which locate the head position in space with respect to the internal coordinate system of the machine. By locating a representative point on the mandrel surface with the probe assembly these position feedback sensors can be read to directly determine the coordinates of the measured point. The X. Y. Z position of a reference point is the X. Y, Z position of the tape laying head at the time of the probe landing plus a known set of offset values for the mounting the probe assembly off center on the tape laying head. In this manner, the representative points on the mandrel surface can be accurately and precisely measured and stored for the derivation of the transformation matrix when a part program is run.

BRIEF DESCRIPTION OF THE DRAWINGS

The foregoing and other objects of the invention accomplished by the mechanism described are explained in detail in the following specification which should be read in conjunction with the accompanying drawings wherein:

FIG. 14 is a flow chart of the method used with the alignment assembly illustrated in FIGS. 5-7 to measure actual points on the mandrel surface illustrated in FIG. 10; and FIG. 15 is a flow chart of the method for using the actual and representative points to transform geometric data from the representative surface to the actual surface.

DETAILED DESCRIPTION OF THE PREFERRED EMBODIMENT

GENERAL ORIENTATION

Figure 1:
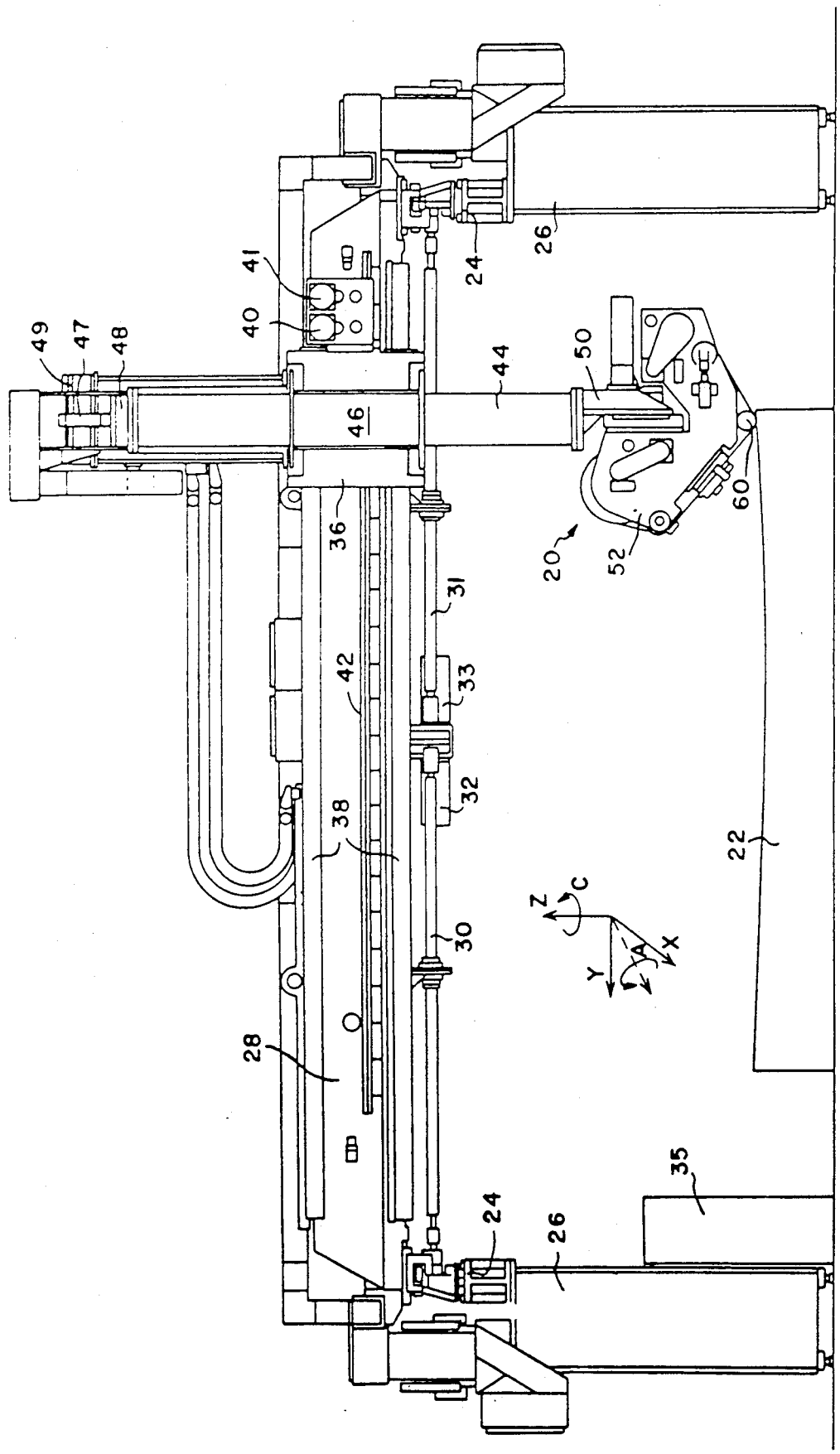
FIG. 1 is an elevational view of a multi-axis tape laying machine having a gantry mounted tape laying head for applying composite tape to a curved mandrel surface.

The tape laying head 20 of a composite tape laying machine to which the invention is applied is illustrated in FIG. 1. The tape laying head 20 is shown suspended from a gantry mounting, poised for laying a course of tape from right to left upon the curved, upwardly-facing surface of a mandrel 22. The mounting arrangement of the tape head 20 provides five axes of movement, three linear in axes X, Y, and Z, and two rotational in axes A and C. A-axis motion is rotational about a horizontal line parallel to the X-Y plane through the center of the tape laying head 20 while C-axis motion is rotational about the Z-axis.

The gantry mounting comprises a pair of spaced parallel rails 24 each elevated upon any suitable trestles 26 or other supports and spanned by a cross rail carriage 28 which is driven along the parallel rails in a direction perpendicular to the plane of FIG. 1 to provide what is termed the X-axis movement of the tape head 20. The X-axis drive is a gear and rack (not shown), the pinions of which are mounted at the ends of cross shafts 30 and 31 suspended from the cross rail carriage 28 and driven without backlash by a pair of opposing servo motors 32 and 33 mounted on the underside of the cross rail carriage midway of its span. Feedback position sensors (not shown) such as angular resolvers are provided with respect to servo motors 32, 33 to generate signals indicative of the actual position of the tape laying head 20 along the X-axis.

Lateral or Y axis movement of the tape head 20 is provided by a movable saddle 36 mounted on ways 38 on the facing side of the cross rail as seen in FIG. 1. The saddle 36 is driven along ways 38 by a pair of opposed servo motors 40 and 41, each driving pinions (not shown) engaged without backlash with the opposite tooth flanks of an elongated rack 42 extending along most of the span of the cross rail 28 and atop the lower one of the ways 38. Angular resolvers or other feedback sensors are associated with servo motors 40, 41, to generate signals indicative of the actual position of the tape laying head along the Y-axis.

The tape head 20 is secured to the lower end of a torque tube 44. The torque tube 44 and ram 46 are vertically slidable in the saddle 36, the turntable being rotated by servo motor 47 through a zero backlash gear drive 48 to provide the rotational movement of the tape head 20 about a vertical or C-axis. The ram 46 is also vertically movable within the saddle 36 by a servomotor and ball screw drive 49 (not shown in detail) to provide vertical or Z-axis movement of the tape head 20. The actual position of the tape head 20 with respect to the Z-axis and C-axis are derived from feedback position sensors, such as resolvers or the like, associated with servo motors 47 and 49.

Figure 2:
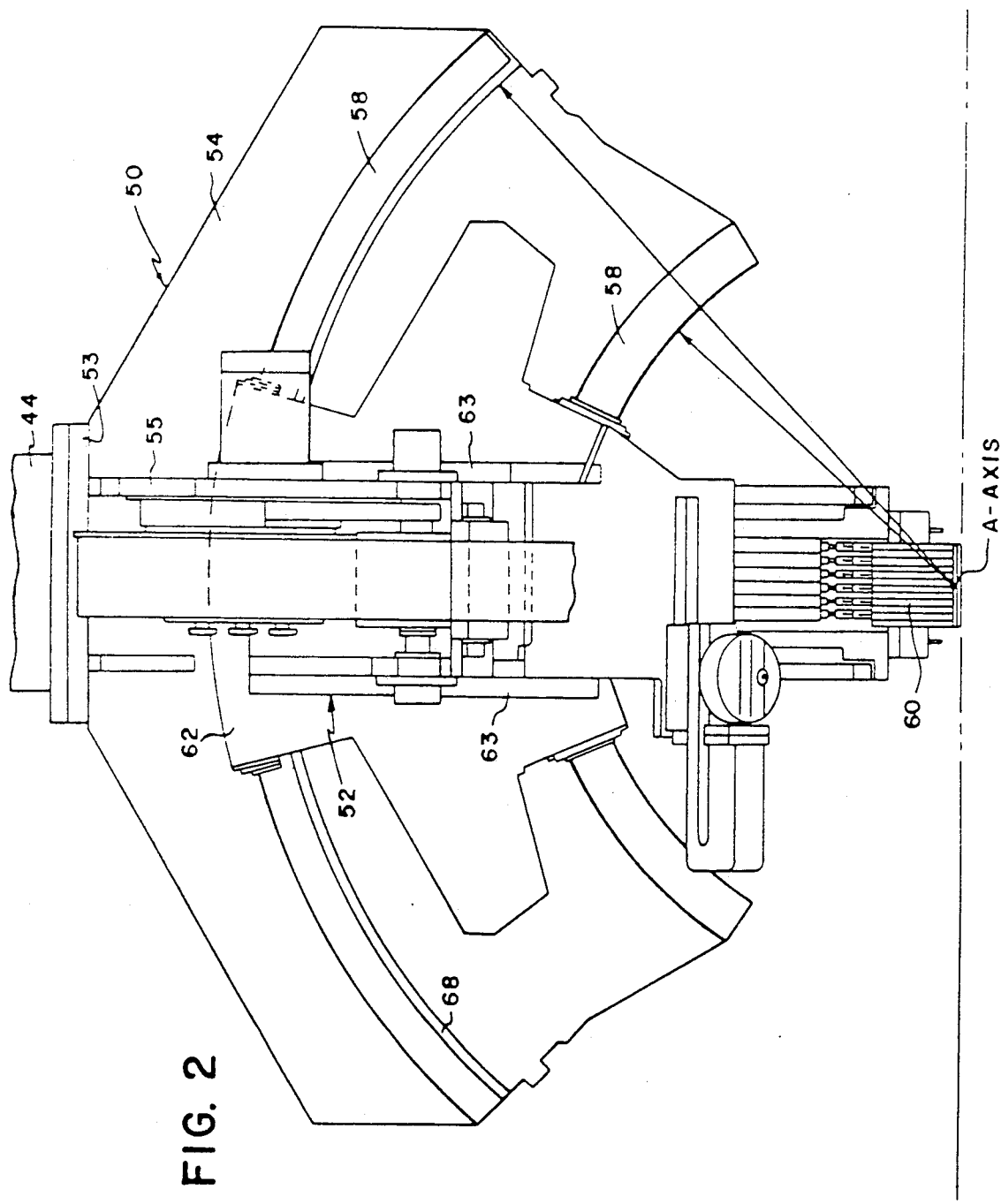
FIG. 2 is a front elevational view of the oncoming tape laying head illustrated in FIG. 1.
Figure 3:
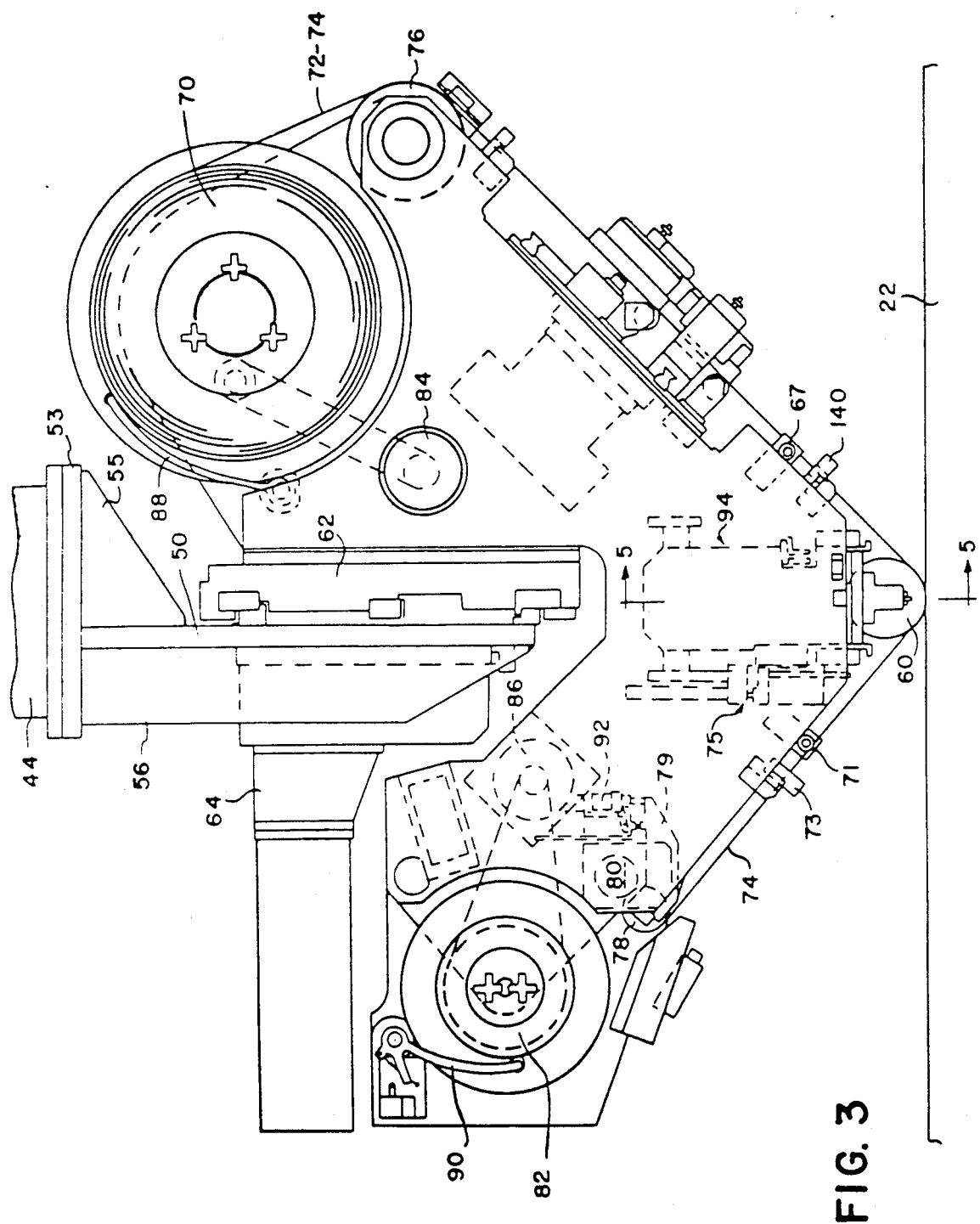
FIG. 3 is a right side elevational view of the tape laying head illustrated in FIG. 1 with an extendable probe assembly shown in phantom on the tape laying roller subassembly.
Figure 4:
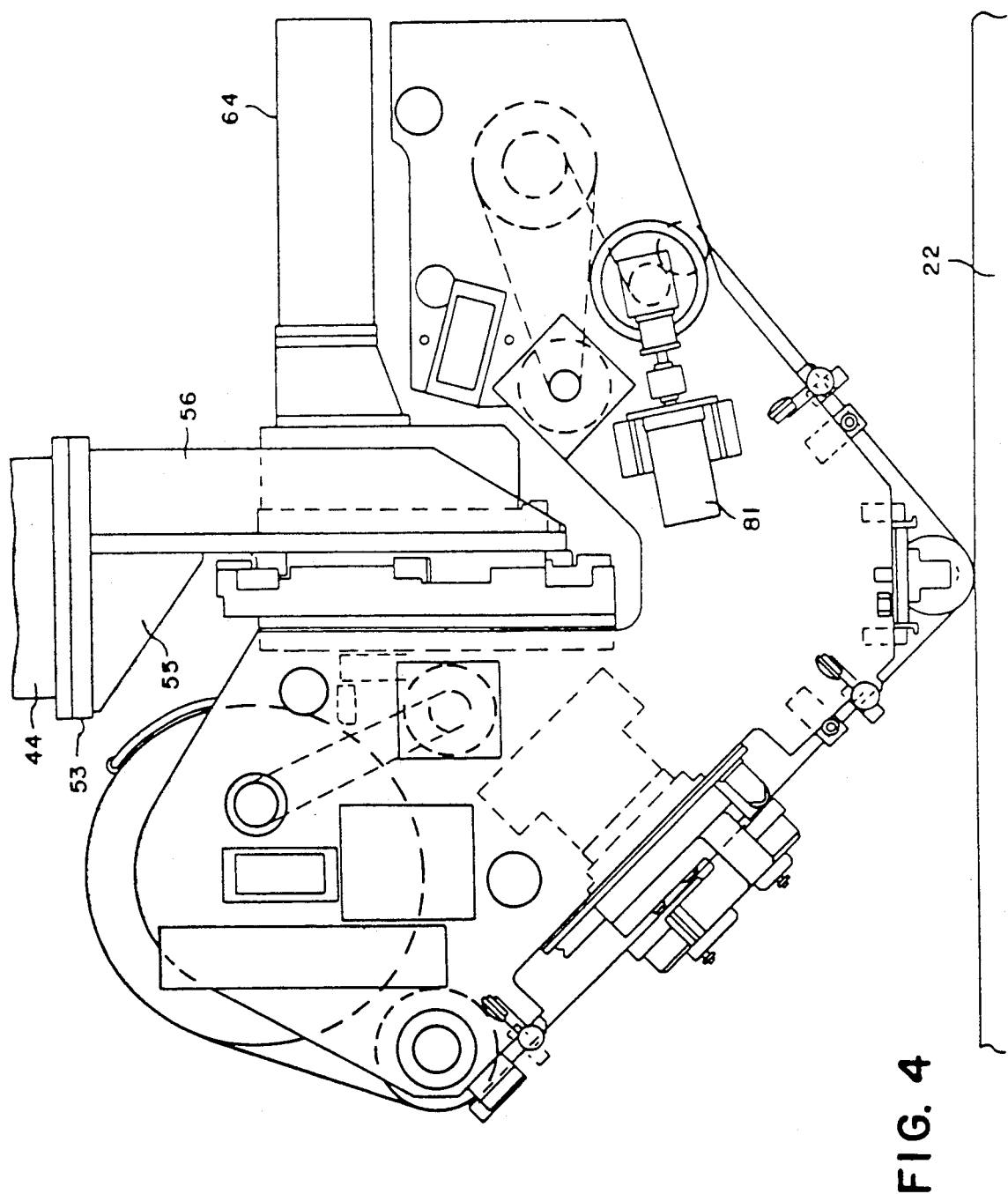
FIG. 4 is a left side elevational view of the tape laying head illustrated in FIG. 1 with the tape laying movement of the head proceeding from right to left.

The fifth axis of movement of the tape head, termed A-axis rotational movement, is best appreciated by comparing FIGS. 2, 3 and 4, which illustrate the two-part frame of the tape head 20, including a suspension frame 50 and a saddle-shaped frame 52 which carries the tape-handling mechanism. The suspension frame 50 comprises a horizontal mounting plate 53 for securing the frame to the torque tube 44 and a broad vertical faceplate 54 braced to the mounting plate 53 by corner brackets 55 on the front side of the faceplate and plate stiffeners 56 on the rear. On its front side, the faceplate 54 carries a pair of precision ways 58 concentric upon the A-axis of the machine, which is tangent to the underside of the segmented tape laydown rollers 60 at its axial center when the roller is in laying position, as later explained. The A-axis is perpendicular to the plane of FIG. 2, and projects as a line in that plane.

The saddle-shaped frame 52 of the tape laying head 20 includes a turntable 62 mounted on the precision ways 58 of the suspension frame 50. The turntable 62 is rotated about the A-axis by a servo motor and gear box 64 mounted on the faceplate 54 which drives two pinions (not shown) engaged with zero backlash with the opposed flanks of a rack 68 secured on the mating face of the turntable 62 (FIGS. 3 and 4). The precision ways 58 on the suspension frame 50 preferably provide 30° of A-axis movement either side of center, and the rotational drive of the torque tube 44 in the saddle 36 of the machine is designed for C-axis rotational movement of 190° in either direction of rotation from a zero reference. A feedback position sensor such as a resolver or the like associated with the servo motor 64 provides a signal representive of the actual positions of the tape head 20 with respect to the A-axis.

There is an internal coordinate system for positioning the tape head 20 which is based on the center point of the laydown rollers 60. The origin for the internal coordinate system is floating or moveable so that the machine may be used easily with many different size mandrels with precision. The signals from the feedback position sensors for the X, Y, Z, A, and C axes are used to locate the position in space of the center of the tape laydown rollers 60. By matching these positions with the preprogrammed positions from a controller unit 35 (FIG. 1), the tape head 20 can be moved to lay tape courses on the mandrel surface and build plies of the courses into laminated articles.

THE TAPE HEAD PROPER

The previously mentioned saddle frame 52 of the tape head proper comprises a pair of spaced plates 63 each respectively secured to the saddle shaped frame 52. A tape supply reel 70 mounted between the plates 63 at the upper forward end of the frame, i.e., at the upper right in FIG. 3, carries a supply of the composite tape 72 adhered to a releasable backing paper 74 which separates the coils of composite tape on the supply reel. From the supply reel 70, the tape 72 and backing paper 74 pass around an idler roller 76 with paper side in contact with the roller, from which it proceeds in a straight line down to the laydown rollers 60 at the very bottom of the tape head. A guide roller 67 removes any curl from the tape between the idler roller 76 and laydown rollers 60 before it enters feedback sensor 140. The adaptive feedback sensor 140 generates a signal which indicates whether the tape 72-74 is centered on the laydown rollers 60. The laydown rollers 60, moving from left to right in FIG. 3, apply pressure to the composite tape to adhere it to the underlying lay surface of the mandrel 22 and to ensure it lies flat.

As the tape head 20 is moved along a path or track, a tape course is layed on the surface and the paper backing tape 74 is simultaneously peeled or released from the composite tape 72 as the latter is laid. The paper backing tape 74 then proceeds diagonally upwardly, being trained in an S-shaped path about a pinch roller 78 and a driven roller 80, and then to a paper take-up reel 82 at the back end of the tape head 20. A guide roller 71 is used to remove the curl from the backing paper before it enters the take-up reel 81 and guidance sensors 73. A photoelectric sensor 73 in combination with a similar sensor for the supply reel, generate signals which ensure that where a course of tape is started, it is always initiated on the edge of the rollers no matter where the last course ended.

The tape supply reel 70 and the paper take-up reel 82 are each respectively driven by timing belts from separate torque motors 84 and 86, respectively, and are regulated to maintain a predetermined level of tension on the paper backing tape 74. Both reels are provided with spring-biased follower arms 88 and 90 which sense the changing radius of the tape on each reel to adjust their respective torque motors to maintain the preset tension.

The composite tape 72-74 is drawn from the supply reel 70 at times merely by advancing the movement of the tape head 20 over the lay surface after the leading end of the tape is anchored to the lay surface, but is additionally positively driven at the beginning and at the end of each tape course, i.e., before sufficient adhesion is developed between the composite tape 72 and the lay surface to anchor the tape to the lay surface as the tape laying head moves away, and is also positively driven near the end of the tape course when the adhesion of the composite tape 72 to its paper backing tape 74 may be insufficient to prevent separation of the pre-cut end of the composite tape from its backing. The tape 72 is also positively driven to reposition and align the tape within the tape head 20 between the end of one course and the start of the next course, i.e., when the laydown rollers are not in contact with the mandrel.

In FIG. 3, an outline of a probe assembly 75 is illustrated as mounted on the roller subassembly 94 offset from its center. The probe assembly 75 moves as the tape laying head 20 is positioned and is used for the measurement of a plurality of reference points on the actual surface of mandrel 22. The position of the head 20 determines the position of the probe assembly 75 with respect to the internal coordinate system of the machine and is adjusted by the amount the probe assembly is offset from the center point of the rollers 60. The probe assembly 75 is shown in a retracted position so that it will not interfere with tape laying during operation of the machine. Normally, the probe assembly is extended only during an alignment operation before starting a part on the mandrel 22 and is then retracted for other movements of the tape laying head 20.

THE TAPE DRIVE

The tape drive comprises the two aforementioned rollers 78 and 80 about which the paper backing tape makes the S-turn enroute to the take-up reel 82. The upper one of these rollers, 80, is driven by a reversible servo motor 81 seen on the left side elevation (FIG. 4) mounted on the outside of the saddle frame 52 of the tape head and driving the drive roller 80 through a right-angle gear box. The lower roller, 78, which functions as a pinch roller, is mounted on a rocker arm 79 (FIG. 3), the opposite end of which is connected to a double-acting, short stroke air cylinder 92 which is energized either to open or close the nip of the two rollers.

When it is desired to drive the tape in either direction, the air cylinder 92 is energized to close the nip of the rolls 78 and 80, and the servo motor 81 is energized in the appropriate direction, unloading one or the other of the torque motors 84 and 86 serving the take-up reel 82 and the supply reel 70, causing one to play out tape and the other to reel it in. The same arrangement, i.e., with the nip of the two rollers closed, similarly serves as a brake which is set whenever the tape head is lifted out of contact with the lay surface.

When the air cylinder 92 is energized to open the nip of the two rollers for the intermediate portion of the tape course, the releasable backing paper remains entrained in its reverse bend about the two rollers. When the tape is moving relative to the tape head by means other than the drive motor 80, as during the laying of a tape course, then the wrap of the backing tape around the drive roller 80 generates sufficient friction to drive a resolver attached to the motor to record the amount of tape laid by measuring the number of turns of the drive motor 81, whether or not the drive motor is energized to draw tape from the supply reel.

THE PROBE ASSEMBLY

Figure 7:
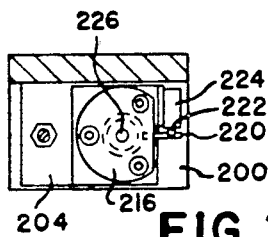
FIG. 7 is a partially cross sectioned top view of the probe assembly taken along line 7—7 in FIG. 5.
Figure 5:
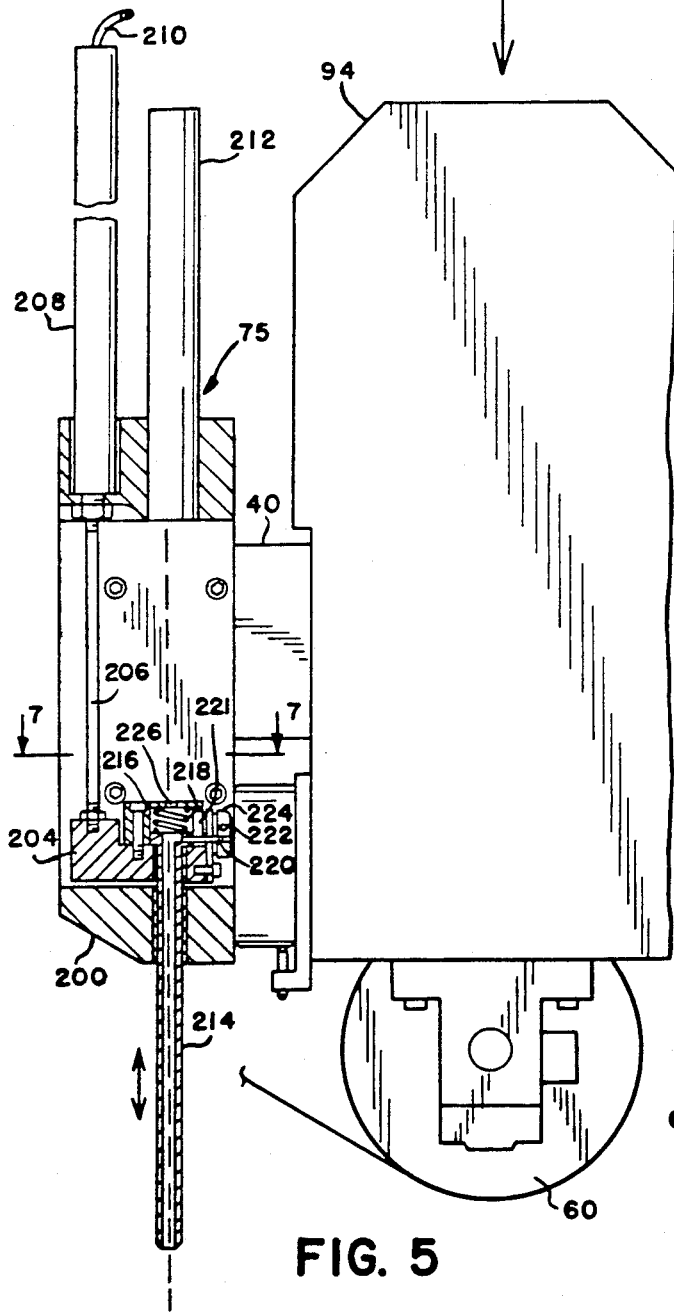
FIG. 5 is a enlarged cross-sectional view of the roller subassembly illustrated in FIGS. 3 and 4 disclosing the attachment and construction of the probe assembly.
Figure 6:
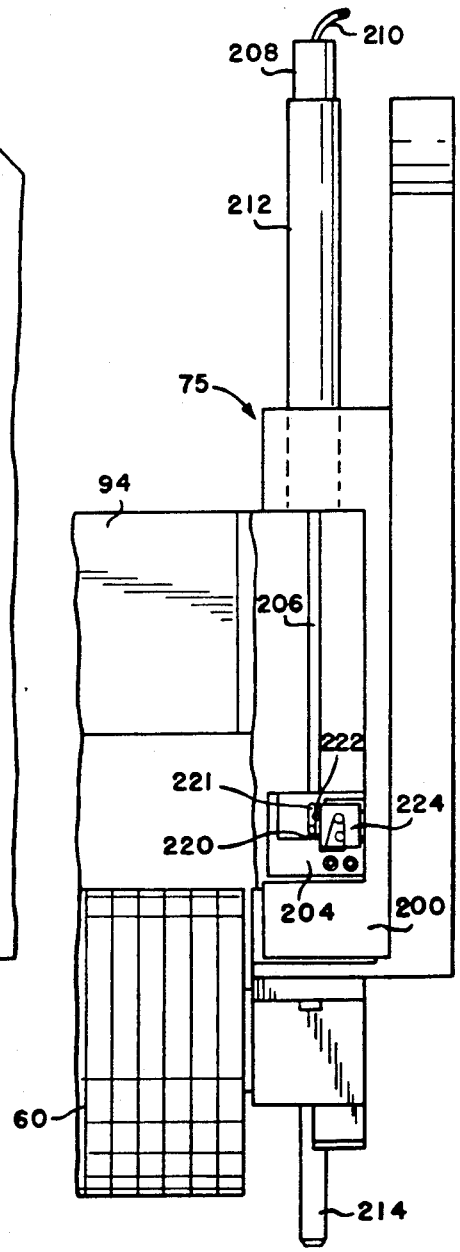
FIG. 6 is a side elevational view of the probe assembly illustrated in FIG. 5.

The probe assembly 75 for determining the relative position of the actual coordinates on the surface of the mandrel 22 with respect to the internal coordinate system of the tape laying machine is more fully illustrated in FIGS. 5, 6, and 7. The probe assembly 75 is mounted on the casing of the laying roller subassembly 94 by means of a C-shaped bracket 200. One leg of the bracket 200 is used for mounting a hydraulic or pneumatic cylinder 208 which is fed by power conduit 210 and an industrial laser apparatus 212. The other leg of the bracket 200 forms a table on which a generally square carriage block 204 abuts when the probe assembly 75 is in an extended position. The carriage block 204 and the piston of hydraulic cylinder 208 are rigidly connected by a shank 206 to provide extension of the carriage block 204 onto the table surface when the cylinder is activated and a retraction from the table surface when the cylinder is vented. The carriage block 204 mounts a generally cup shaped cover 216 having a chamber in which a spring 218 biases a probe member 214 against the upper surface of the carriage block 204. The probe member 214 is generally elongated and tubular in shape and includes a pin 220 mounted perpendicularly to the longitudinal axis of the probe member. The pin 220 protrudes from a slot 221 in the cover 216 and is positioned to engage the actuator button 222 of a limit switch 224 when the probe member 214 is moved vertically upward against the bias of spring 218.

When not in operation during an alignment, a probe assembly control in control unit 35 (FIG. 1) turns off the laser 212 and vents fluid power from conduit 210 and the hydraulic cylinder 208. This causes a retraction of the carriage block 204 such that probe member 214 is moved vertically upward to where it clears the bottom of the tape laying rollers 60 and the tape path. When, however, the operator wants to determine the position of an actual point on the surface of the mandrel 22 with respect to the internal coordinate system of the tape laying machine, the probe assembly control activates the probe mechanism by turning on the laser 412. The laser 412 provides a bright, small spot of monochromatic light which serves as a tracer or guide to the operator in positioning the tape laying head 20. The small spot is visible to the operator on the mandrel 22 and traces the movement of the vertical axis of the laser 212 as the tape laying head 20 moves.

Thus, with the apparatus at this configuration, the bright spot of light passes through an opening 226 in the cover 216, the center of the spring 218, and the bore of the probe member 214 to provide a locating spot on the surface of the mandrel 22. The operator can jog or incrementally position the tape head 20 until the central axis of the probe mechanism is vertically aligned with the point on the surface of which he wants to measure the coordinates. The operator moves the tape laying head 20 until the small light spot coincides with the point where he desires to take a reading such that an exact X, Y position is determined for that point on the surface.

The actuation of the cylinder 208 places the carriage 204 in abutment with the surface of the table of the bracket 200. With the cylinder 208 actuated, the probe 214 now extends below the lowermost position of the tape laying rollers 60 and is biased by spring 218 in a fully extended position. Next, the probe assembly control automatically moves the tape laying head 20 vertically along the Z-axis in small incremental steps with a small delay between steps. When the probe 214 actually touches the surface, the pin 220 will move upwardly to trip the actuator button 222 on the limit switch 224 and indicate a landing. The limit switch 224 generates a signal to the control unit 35 to indicate the Z-axis position at which the landing happens.

At this point the X, Y, and Z coordinates of the actual point on the surface of the mandrel 22 are calculated by storing the readings of the feedback position sensors for the unaltered X, Y, and Z feedback positions. These readings are modified by predetermined offsets for X, Y, and Z because the probe assembly 75 is translated in the X, Y plane away from the center of the lay down roller 60 and extends a certain distance on the Z-axis below the lowest point of the laydown rollers 60. After the known offsets of the probe assembly 75 have been subtracted from the coordinates of the point on the surface of the mandrel 22, the resulting position coordinates can be taken to be the actual position of that point relative to the internal coordinate system of the tape laying machine. The process of actually determining points on the surface of the mandrel 22 can be continued until enough points are determined to calculate the actual orientation of the mandrel surface.

THE CONTROL LOGIC

Figure 8:
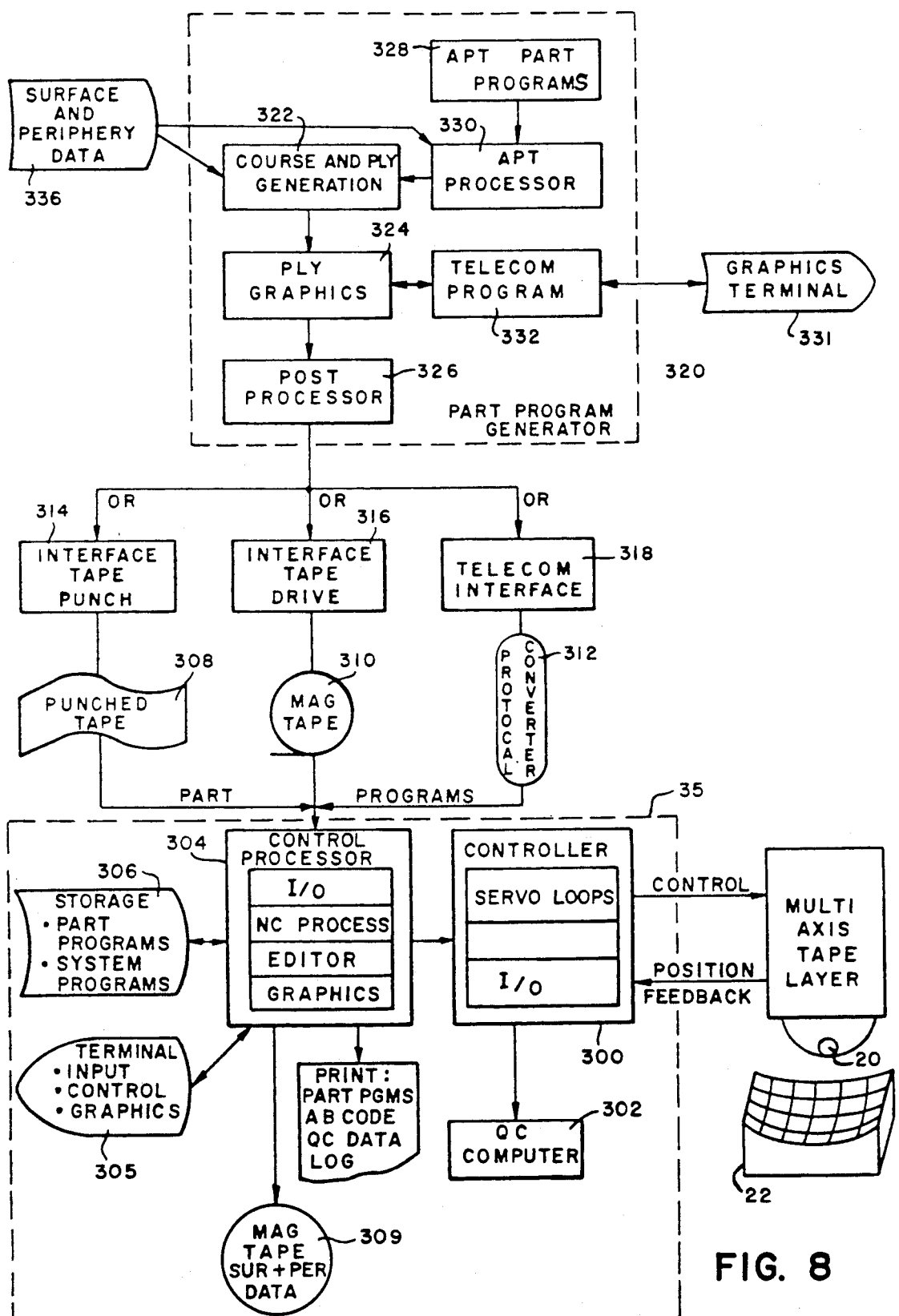
FIG. 8 is a detailed functional block diagram of the control system for the tape laying machine illustrated in FIG. 1.

As more fully seen in the block diagram of FIG. 8, the motions of the tape laying machine are regulated by the control unit 35 (FIG. 1) including a controller 300 which produces electrical control signals and receives the position and adaptive feedback signals to position the tape laying head 20 according to position commanded by a part program. The part program defines the desired position in space of the tape laying head 20 and the position feedback signals indicate the actual position of the head to the controller 300. The difference in these signals is nulled in a closed loop until the actual position equals the desired position such that the tape is layed in a precise manner. Signals indicating the difference between the actual and desired positions may be provided to a satellite quality control computer 302 to determine whether the tape is being laid correctly and to store the results of the actual lay.

The controller 300 is a CNC machine which can execute an a extensive and detailed part program, a portion at a time, by being periodically supplied with sequentially generated control blocks. These control blocks contain detailed motion and control information in each block and are comprised of series of standardized control function implementations for the particular tape laying machine. Executing the control blocks causes the actual physical tape laying head 20 motion and control along a natural path.

In the present system the controller 300 is implemented as an Allen Bradley 8200 CNC controller, or equivalent CNC controller, which can be programmed to regulate motion and control of the multi-axis tape laying machine. The program of the controller 300 implements a closed loop control which is given desired position commands by a control processor 304. These position commands are executed by the controller 300 to position the tape head 20 in a normal closed loop manner. These positions are modified for actual surface conditions for the A, C, and Z-axes by adaptive feedback signals.

The adaptive control (not shown) actively regulates the vertical positioning of the rollers 60 (Z-axis positioning) to maintain surface contact with a constant application pressure and a substantially constant tape length between the cutters and the laydown rollers, actively regulates the A-axis positioning to maintain an equal length of tape from side to side, and actively regulates the C-axis positioning to maintain the tape squarely under the rollers 60.

The control blocks of machine instructions are generated to the controller 300 by a control or interpreter processor 304. The control blocks are generated by the interpreter processor 304 from part programs generated by part program generator 320 or previously generated part programs stored in a system storage unit 306. The part programs, comprising a plurality of tape blocks, are in a geometric format relative to the natural tape path of each course. The information for each course consists of one tape block describing the end cuts of a course and one or more tape blocks describing the course centerline of the path. This format contains all the geometric information for one course of a ply but is not machine specific.

The controller 300. however, only recognizes regular machine instructions or commands representative of a single machine action or canned cycle machine instruction commands indicating a plurality of machine actions in a single block. The course tape blocks contain complex information which command many more machine actions. such as axis motion, sheer and cutter control, roller control, and other miscellaneous functions. Therefore, this complex course data must be interpreted and converted into the machine instructions that the controller 300 recognizes. This is the function of the interpreter processor 304 which expands the tape course blocks into detailed motion and control blocks of machine instructions recognizable by the controller 300.

The part program generator 320 accepts basic article information from a surface file 336 and periphery data from an APT part programs file 328 to automatically generate the tape courses based on a natural path which are output as a part program from a post processor 326. The tape course information or part program from the post processor 326 can be alternatively communicated to the control processor 304 through any of the three interfaces 314, 316, and 318. The part program may be interfaced through a tape punch 314 by punched paper tape 308, output on magnetic tape 310 from a tape drive 316, or interfaced directly through a telecommunications interface 318 and a protocol converter 312.

The information used to generate the tape course data from the surface file 336 and periphery data from the APT part programs file 328 is a rectangular array of points obtained from a mathematical description of the surface of the mandrel 22, the peripheral outline of the plies to be laid, one or more control lines indicating areas where the gaps between courses are to be held at a close tolerance. and the angle at which the courses of each ply should be laid with respect to the X-axis.

The part program generator 320 receives this information and uses a conventional APT processor program 330 to assemble a basic part program shell. The program shell consists of geometric information describing the article to be manufactured by the number and position of the plies and the general direction and configuration of the tape courses. This shell is made from the surface information stored in data file 336 and from command data previously stored as standard APT part programs in file 328. The APT processor 330 is a program providing the necessary software tools for a part programmer to assemble the part program shell from these two data sources. The part program shell essentially describes the article in the geometric terms of plies but without natural path data included.

Once the shell program is assembled from the various sources of data, it can be expanded by a course and ply generation routine 322 to include natural path data for the tape courses. The course and ply generation routine 322 may be commanded to generate a whole ply or to generate individual courses with natural paths for the control processor 304. When a command is given to generate a ply, the system automatically computes all the natural paths and end cuts for each course covering the area bounded by the ply periphery. The gaps between the courses of the ply are kept at a specified tolerance along the control lines and the direction of the tape lay can be reversed 180° between two adjacent courses to minimize machine motion and tape scrap.

After the courses of one ply are generated, the surface data in memory are updated to reflect the thickness of the new ply.

The part program generator 320 provides graphics monitoring where the generated courses of the composite tape can be visually inspected by an operator on a graphics terminal 331. With the aid of the graphics terminal 331, a part programmer through the keyboard of the terminal can make adjustments to the courses with a ply graphics routine 324 to provide more control over the gap and overlaps of the tape courses for a ply.

Figure 9:
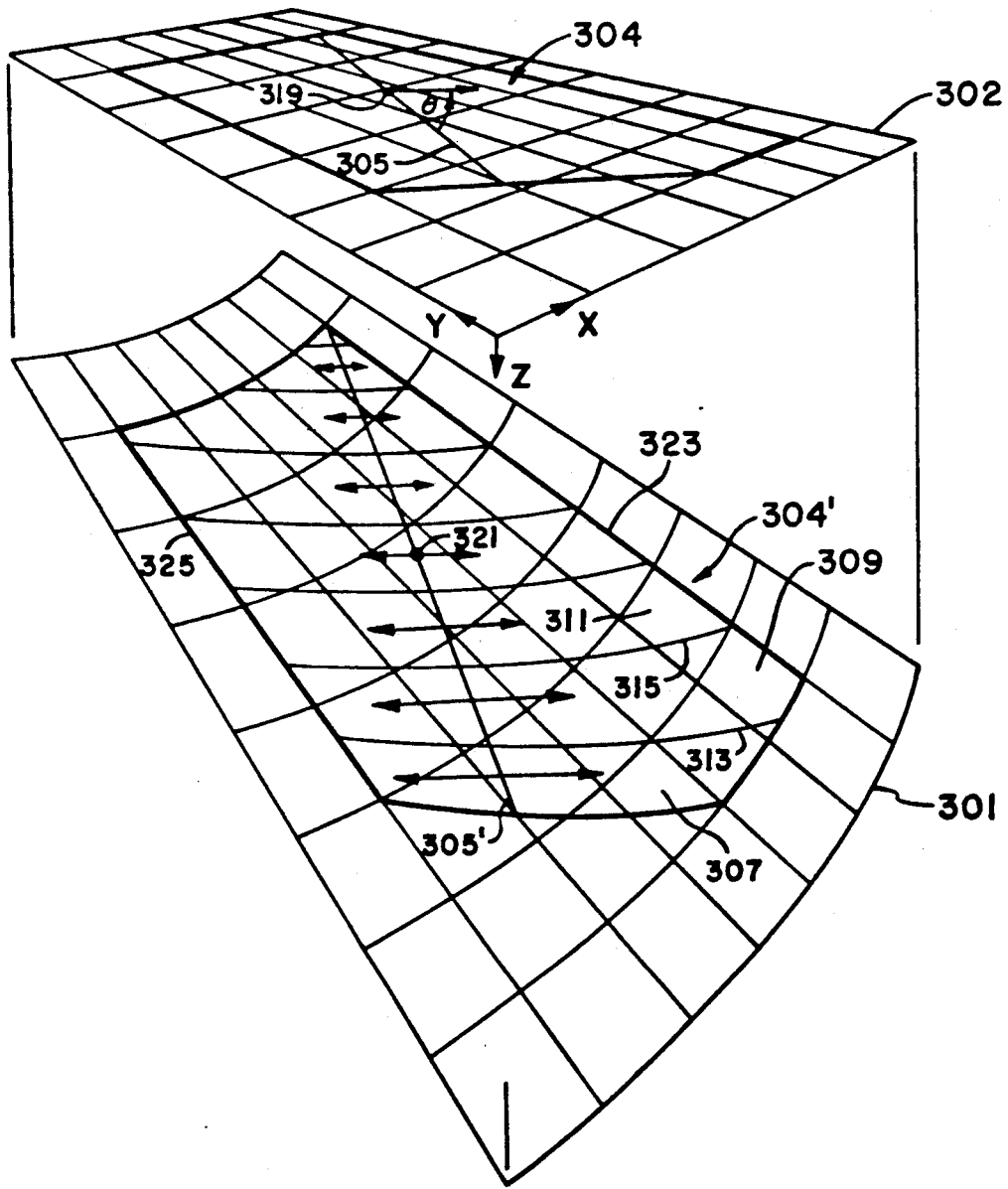
FIG. 9 is a pictorial representation of a surface and the peripherial extent of an article on a contoured surface for the tape laying machine illustrated in FIG. 1.

FIG. 9 illustrates a pictorial representation of the data which is input to the part program generator 320. The initial or starting surface of the mandrel 22 is mathematically represented by surface 301 as a number of rectangular coordinate points forming a grid. The grid lines are equally spaced along the surface of an X-Y plane 302 a real distance apart, such as one inch. The grid points are stored in the sequential data file 336 (FIG. 8) such that the X, Y, and Z coordinates of each surface point are maintained for operation by the part program generation. For the preferred implementation, the maximum size of a grid is 600×160 grid points.

Projected on the surface 301 is a ply periphery 304 which defines the outermost edges of the finished article on the mandrel. The ply periphery 304 is projected from the X, Y plane 302 such that the same termination criteria for the courses may be used for all the different plies by projection. The surface 301 described by the grid points is extended at least some distance beyond the edges of the intended article because during natural tape path calculation some of the edge points calculated may end up outside of the edges of the part. To correctly calculate these points, the surface extention is necessary.

A control line 305 is also provided for determining an area along which the gaps between courses of tape are closely controlled. The control line 305 is further defined in the X, Y plane such that it may be projected upon each ply similar to the manner that the periphery 304 was projected. One ply of composite tape laid on the surface 301 is shown, as is the projection 304' of the ply periphery onto the Z coordinates of the surface 301. The control line projection 305' from the control line 305 is also shown.

Each course, for example 307, 309, 311, follows a natural path on the surface or contour 301 without putting unequal tension on the edges of the course and has its ends cut to fit within the periphery. Each course is laid on the surface in an opposite direction to the one adjacent to it to minimize tape waste and machine motion. The gaps between adjacent courses, for example, 313 between courses 307 and 309, and 315 between courses 313 and 311 are controlled to a very close tolerance along control line projection 305' but are not as closely regulated away from that line. General angles that the tape courses make with respect to the X-axis are 0°, 45°, and 90°. Further, particularly for the 45° application, plies may alternate from +45° to −45° so that the courses of adjacent plies will crisscross for strength in the building of an article. However, it is readily evident that any angle with respect to a reference may be used.

The computation of the natural path is basically as follows. First, a load point 321 is calculated on the surface where the natural path on the surface 301 will cross the projected control line 305'. The course path is now split into two paths, with each path starting at point 321 and being computed in opposite directions at a control angle until they intercept the opposite ply periphery segments 323, 325. The computed path points are then merged into one path and rearranged to have a path direction opposite to that of the an adjacent course. The initial course angle is measured with respect to the X-axis at the point where the center of the course crosses the control line.

There are several distinct advantages to this method of calculating a natural tape path on a complex contoured surface. Initially the gap distance 313, 315 between tape courses on the control line can be readily regulated because the load points are picked along it. Further, the natural path is generated in both directions from the control line such that, although the gaps are not tightly controlled, the tension in the edges of the tape are minimized. This prevents wrinkling, overlays, and other detrimental positionings of the tape. Moreover, the angular orientation tape courses with respect to the control line allow a efficient use of the tape while minimizing the complexity of the end cuts. It is desirable to lay the composite tape at an angle transverse to the control line such that strength is maintained in the composite article but efficient use of the tape product is also provided.

Figure 10:
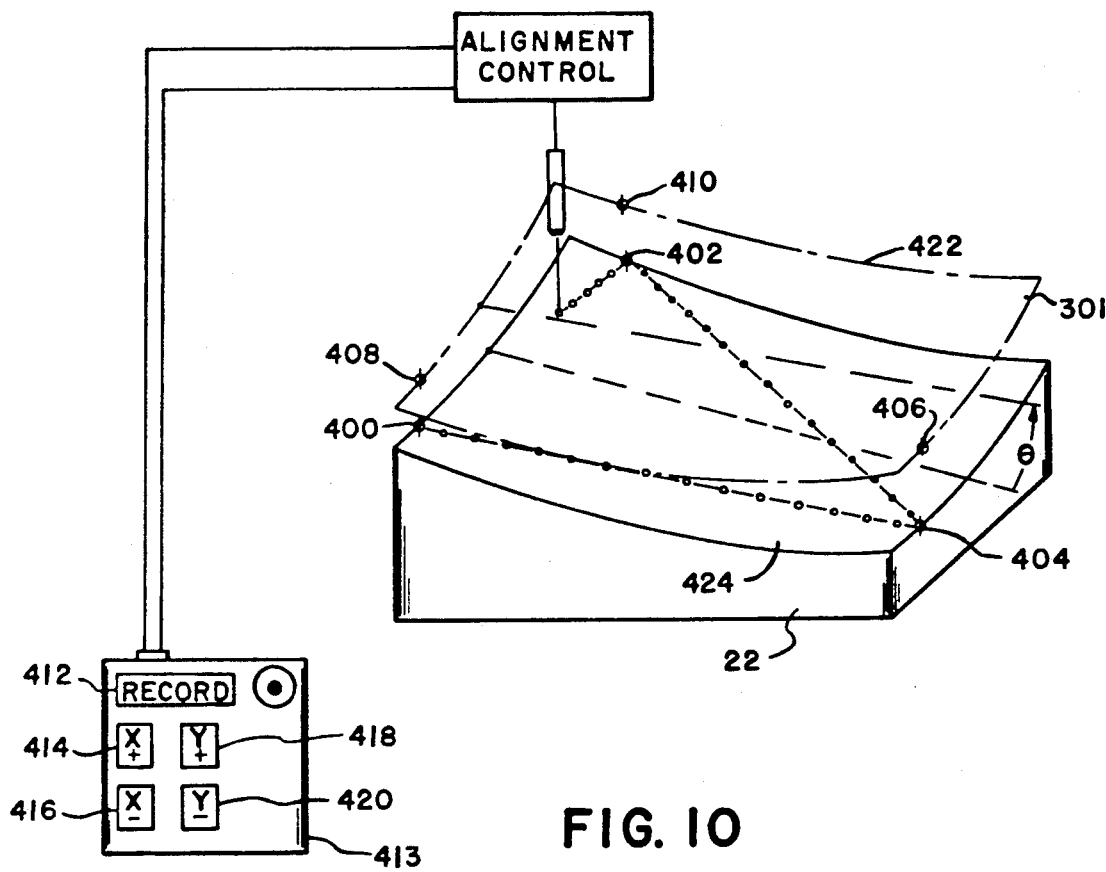
FIG. 10 is a pictorial representation of the method for aligning the representative surface used to form the grid illustrated in FIG. 9 with the actual surface of the mandrel illustrated in FIG. 1.

With reference now to FIG. 10, the process for determining each one of several actual reference positions on the surface of mandrel 22 relative to the internal coordinate system of the tape laying machine will now be more fully described.

The figure illustrates the actual surface of mandrel 22 having three reference marks 400, 402, and 404 with cross hairs on the surface. These reference marks can be painted, embedded into the surface, or the like, as long as they are relatively permanent and visible. The three actual reference marks correspond to points 406, 408, and 410 of the representative surface 301 shown in phantom. The representative surface 301 may be translated and rotated from the actual surface as is shown because of misalignment of the mandrel 22. However, the part program instructions have been generated relative to the orientation of the representative surface 301 and not with respect to the actual surface. Motions of the tape laying head 20 will, therefore, be in error by the amount of this misalignment.

The invention provides an alignment method which reorients geometric points of the part program instructions to the orientation of the actual surface rather than attempting to realign the actual surface to the representative surface. The alignment procedure includes a method for measuring the actual orientation of the surface of the mandrel 22 by measuring the coordinates of the reference marks thereon and a method using the measured orientation and the known orientation of the representative surface to derive a transformation function with which to transform geometric points of the part program instructions from the representative to the actual orientation.

The method of determining the actual orientation will now be more fully explained by reference to FIG. 10 and the flow chart of FIG. 14. The operator of the tape laying machine begins the alignment method by calling a special program of the control processor 304 called ALIGNMENT before tape is fed through the head 20. The control processor 304 communicates with the controller 300 when the alignment routine is called to set the controller into a manual or jog type of operation under control of a pendant 413. The operator signals that he is ready to begin the alignment process by pressing a cycle initiate button on the controller 300 to perform manual positioning of the tape laying head 20 as indicated in block A10. This operation allows for positioning of the tape laying head 20 with the pendant 413 in either direction on the X, Y axes and the operator should have it in his hand and be near surface of the mandrel 22. The program thereafter turns the laser on in block A14.

Next, the program enters a loop for recording the coordinates of the reference marks on the tool surface with respect to the internal coordinate system of the tape laying machine. In the present example there are three reference marks 400, 402, and 404 and the loop executes three times. Blocks A16–A30 comprise the loop and the first operation of block A16 allows $\pm X$, $\pm Y$ inputs from the pendant 413 to position the laser spot directly over one of the reference points, say 402. 402 in the X-Y plane. As seen in FIG. 10, the incremental jogging of the tape head allows the operator to trace a visible path with the laser spot to where it exactly aligns in the X, Y plane with the reference mark 402 on the surface of the tool 22. Each incremental jog or manual movement of the tape laying head 20 is executed until the test in block A20 is passed affirmatively. When the operator visually determines that the probe is aligned in the X, Y plane by centering the light spot on the cross hair of the reference mark 402, he will then depress the RECORD key 412 on the pendant 413. Until the signal by the RECORD key 412, the program will continue to receive pendant commands and move in incremental X, Y steps.

After the RECORD command has been recognized in block A22, the program will store the actual X position of the tape head 20 plus an offset from the center of the roller 60 attributable to the probe axis. Likewise, the actual Y position of the tape laying head 20 will be recorded plus the offset from the center of the roller 60 attributable to the probe axis. These positions can be taken directly from the feedback position resolvers for the X and Y-axes of the tape laying head 20. The offset constants are stored in the ALIGNMENT routine as data and do not change once they are set.

In the next steps A24–A26, the Z coordinate of the reference mark 402 is determined by automatically moving the probe incrementally toward the tool surface with -Z jogs. After each small incremental move, the program checks to determine whether the lost motion device of the probe has tripped the limit switch 224 indicating a landing on the reference mark 402. This will cause the test in block A26 to be affirmatively passed and transfer program control to block A28 where the actual Z position of the reference mark 402 on the tool surface is stored. The Z coordinate stored for that position is the coordinate sensed by the feedback position sensor of the Z-axis minus the offset between the center position of the rollers and the end of the probe tip in the extended position. Finally the program will retract the probe in block A27 and retract the tape laying head 20 on the Z-axis to an initial home position which is sufficiently far from the tool 22 to provide clearance of the surface in block A30.

The retraction of the tape laying head 20 in block A30 is a signal to the operator to again begin the loop once with pendant instructions to move in the $\pm X$, $\pm Y$ plane such that the laser spot is centered over the cross hair of the next reference mark, for example mark 404. Blocks A16-A30 are then executed until the coodinates of the second reference mark 404 are stored. Thereafter, the loop is executed once more to determine the actual coordinates of the third reference mark 400. Once the coordinates of the third reference mark 400 have been determined, the program will turn the laser off in block A34. As a preliminary to starting a part program, the actual coordinates of the three reference marks 400, 402, and 404 in X, Y, and Z are sent to the control processor 304 in block A36. These actual coordinates are then stored in the control processor 304 to be later compared with the coordinates corresponding to the mathematical description the surface points of the mandrel 22.

When a part program is started, as shown in the flow chart of FIG. 15, the transformation algorithm will read the coordinates of the representative points 406, 408, and 410 from the part program file, and further, will read the coordinates of the three actual points 400, 402, and 404 of the surface of the mandrel 22. These operations are represented by blocks A38 and A40 of the transformation program in FIG. 15. Next in block A42, the differences in coordinates between the actual and representative points are used to form a transformation function which is a function indicating the manner in which a point in the part program instruction must be translated and rotated to match the same point on the actual surface 22. The natural path data points from the part program are then transformed into a new part program oriented to the actual surface points rather than the reference surface points in block A44.

After the geometric data has been transformed relative to the new orientation of the actual surface, the control processor 304 will take the geometric data and generate the machine specific instructions that cause the path movement for the tape laying head 20 to follow the natural path of the particular tape course. It is understood that as an alternative rather than fully transforming the part program, that each point on the natural path can be transformed at the time when the machine specific instructions for its movement are generated. Because the transformation between the orientation of one surface and another can be defined as a function, this will allow the program of the control processor 304 to perform only one additional step per part program point before the machine specific translation.

The transformation is necessary because when the actual tool surface is not exactly aligned with the mathematical representation of that surface used to generate the natural path, the movement of the tape laying head 20 will be in error by the amount of the misalignment. The error can be envisioned as two separate parts where, defining one point 408 on the representative surface 301 as a reference, the actual surface 22 is translated from that point to point 400 and then rotated about that translation.

Figure 11:
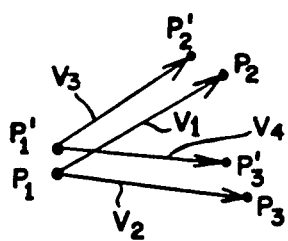
FIG. 11 is a pictorial vector diagram illustrating the formation of vectors for two orthonormal systems based on the points for the actual and representative surfaces illustrated in FIG. 10.

To determine a compensation algorithm or function for this translation and rotational error, there must first be found the corresponding reference points on each surface. The number of reference points chosen on each surface can vary but in our example will be three because, as will be more fully explained hereinafter, two orthonormal coordinate systems based on the representative points will be formed. With reference to FIG. 11, from the three points 400, 402, and 404 on the actual surface 22 which are defined as $P_1$, $P_2$, $P_3$, two vectors $V_1$, $V_2$ are formed where $$V_1 = P_2 - P_1.$$

and $$V_2 = P_3 - P_1.$$

From these two vectors an orthonormal triad of unit vectors can be formed by chosing one of the points, for example $P_1$, as an actual origin and forming cross products of the vectors $V_1$, $V_2$.

Figure 12:
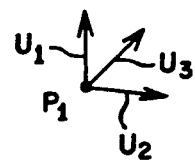
FIG. 12 is a pictorial vector diagram illustrating a triad of unit vectors forming a first orthonormal system from the vectors of the actual surface illustrated in FIG. 11.

One set of orthonormal unit vectors $U_1$, $U_2$, $U_3$ shown in FIG. 12, can form the system triad where $$U_1 = V_1 \times V_2,$$

$$U_2 = V_2,$$

and $$U_3 = U_1 \times V_2.$$

Similarly, we form another orthonormal triad of unit vectors based upon the representative points 408, 410, and 406 defined as points $P_1'$, $P_2'$, $P_3'$ where each of the points correspond on the representative surface to those points selected on the actual surface. To accomplish this, two vectors $V_3$, $V_4$ are defined in FIG. 11 where $$V_3 = P_2' - P_1'$$

and $$V_4 = P_3' - P_1'$$

Figure 13:
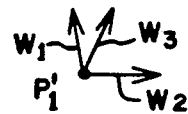
FIG. 13 is a pictorial vector diagram of a triad of unit vectors forming a second orthonormal system from the vectors of the representative surface illustrated in FIG. 11.

An orthonormal triad of unit vectors $W_1$, $W_2$, $W_3$ from these two vectors $V_3$, $V_4$ can be formed in FIG. 13 by cross products chosen in the same order for the first system, i.e., $$W_1 = V_3 \times V_4,$$

$$W_2 = V_4,$$

and $$W_3 = W_1 \times V_4.$$

It should be noted that the same order of calculation is selected for each of the two triads to maintain the respective orientation of the two surfaces to each other. The two systems $$U = \begin{bmatrix} U_1 \\ U_2 \\ U_3 \end{bmatrix} \text{ and } W = \begin{bmatrix} W_1 \\ W_2 \\ W_3 \end{bmatrix}$$

are rotated from each other by a transformation matrix $$T = \begin{bmatrix} T_1 \\ T_2 \\ T_3 \end{bmatrix}$$

where $$UT = W$$

If the transformation matrix T can be found, then any point in the representative surface can be transformed to the actual surface such that the tape laying head will be moved relative to the actual surface rather than the representative surface.

The transformation matrix can be solved for by use of the inverse matrix $U^{-1}$ $$U^{-1}UT = U^{-1}W$$

and $$T = U^{-1}W$$

By definition for an orthonormal system of unit vectors $U_1, U_2, U_3$; $U^{-1} = U^T$, where $U^S$ is the transpose matrix of $U$, substituting:

$$T = U^T W$$

Expanding T, $U^T$, and W we have:

$$\begin{bmatrix} T_{1X} & T_{1Y} & T_{1Z} \\ T_{2X} & T_{2Y} & T_{2Z} \\ T_{3X} & T_{3Y} & T_{3Z} \end{bmatrix} = \begin{bmatrix} U_{1X} & U_{2X} & U_{3X} \\ U_{1Y} & U_{2Y} & U_{3Y} \\ U_{1Z} & U_{2Z} & U_{3Z} \end{bmatrix} \begin{bmatrix} W_{1X} & W_{1Y} & W_{1Z} \\ W_{2X} & W_{2Y} & W_{2Z} \\ W_{3X} & W_{3Y} & W_{3Z} \end{bmatrix}$$

where:

$T_{1X} = U_{1X}W_{1X} + U_{2X}W_{2X} + U_{3X}W_{3X}$ $T_{1Y} = U_{1X}W_{1Y} + U_{2X}W_{2Y} + U_{3X}W_{3Y}$ $T_{1Z} = U_{1X}W_{1Z} + U_{2X}W_{2Z} + U_{3X}W_{3Z}$ $T_{2X} = U_{1Y}W_{1X} + U_{2Y}W_{2X} + U_{3Y}W_{3X}$ $T_{2Y} = U_{1Y}W_{1Y} + U_{2Y}W_{2Y} + U_{3Y}W_{3Y}$ $T_{2Z} = U_{1Y}W_{1Z} + U_{2Y}W_{2Z} + U_{3Y}W_{3Z}$ $T_{3X} = U_{1Z}W_{1X} + U_{2Z}W_{2X} + U_{3Z}W_{3X}$ $T_{3Y} = U_{1Z}W_{1Y} + U_{2Z}W_{2Y} + U_{3Z}W_{3Y}$ $T_{3Z} = U_{1Z}W_{1Z} + U_{2Z}W_{2Z} + U_{3Z}W_{3Z}$

With this transformation matrix T any point $P_{P_o}[X_{P_o}, Y_{P_o}, Z_{P_o}]$ of the part program referenced relative to the mathematical surface can be rotated to the orientation of the actual surface. However, because of the assumption that both the U system and the W system have the same origin, a translation equation must first be applied to the points of the mathematical surface before the transformation matrix T can be used.

Let $P_{P_o}$ be any point on the mathematical surface, the translation equation:

$$P_P = P_{P_o} - P_1$$

translates the point $P_{P_o}$ to the point $P_P$ in the new unit vector coordinate system, where $P_1$ is the origin of the unit vector triad $U_1, U_2, U_3$ and $P_P$ is the translated point to which the transformation matrix can be applied.

The transformation matrix T can then be applied as:

$$P_P T = P_{P'}$$

where $P_{P'}$ is the transformed point. The point $P_{P'}$ is still referenced to the unit triad U and, therefore, must be translated back to the actual surface with the translation equation:

$$P_{P'} + P_1 = P_t$$

where $P_t$ is the transformed and translated point on the actual surface which corresponds to the mathematical point $P_{P_o}$. Point $P_t$ is referenced to the actual surface to align the orientation of that surface to the machine coordinate system. Point $P_t$ and other transformed and translated points are then used to generate machine specific instructions to move the tape laying head 20 along the axes.

While a preferred embodiment of the invention has been illustrated, it will be obvious to those skilled in the art that various modifications and changes may be made thereto without departing from the spirit and scope of the invention as defined in the appended claims.

What is claimed is:

1. A method of aligning an actual surface with a single internal coordinate system of a machine which moves relative thereto, wherein the movements of the machine are controlled by a part program including a plurality of programmed points defining a machine path from a mathematical representation of the actual surface and a work function referenced to the internal coordinate system, the alignment method comprising the steps of:

measuring the coordinates of at least three of the actual points on the actual surface with respect to the internal coordinate system of the machine:

obtaining the coordinates of the corresponding representative points from said mathematical representation of the actual surface with respect to the internal coordinate system of the machine;

generating a transformation function based on said actual points and said representative points which describes the orientation of the actual surface with respect to the mathematical representation of the actual surface in the coordinate system of the machine; and transforming said programmed points with said transformation function such that a plurality of transformed points area generated which describe the programmed movements of said machine relative to said actual surface; and replacing said programmed points with said transformed points such that the part program defines the machine path with respect to the orientation of the actual surface.

2. A method as defined in claim 1 wherein said step of measuring the coordinates of a plurality of actual points includes the step of:

measuring the distance from the origin of said internal coordinate system for each of said plurality of actual points.

3. A method as defined in claim 2 wherein said step of measuring includes the step of:

moving an element of the machine relative to said actual point on the actual surface until said element contacts the surface at the actual point; and determining the coordinates of said actual point by the coordinates of the position of said element.

4. A method as defined in claim 3 wherein said step of moving an element of the machine includes:

moving said element horizontally until the element and said actual point are aligned in a horizontal plane.

5. A method as defined in claim 4 which further includes the step of:

moving said element vertically until the element contacts the actual point.

6. For a machine having a single internal coordinate system, a method for aligning an actual surface with a mathematical description of that surface which is used to generate a part program for controlling the movements of the machine with respect to the actual surface, the alignment method comprising the steps of:

measuring at least three actual points on the actual surface with respect to the internal coordinate system of the machine;

defining one measured point as an actual origin;

calculating a first vector from said one origin point to a second one of said measured points;

calculating a second vector from said one origin point to a third one of said measured points;

forming an orthonormal set of unit vectors $U_1$, $U_2$, $U_3$ from said first vector and second vector;

obtaining from said part program at least three representative points of said mathematical description corresponding to said three actual points on the surface;

defining one representative point as a representative origin;

calculating a third vector from said representative origin to a second one of said representative points;

calculating a fourth vector from said representative origin to a third one of said representative points;

forming an orthonormal set of unit vectors $W_1$, $W_2$, $W_3$ from said third vector and said fourth vector;

calculating a transformation vector $T_1$, $T_2$, $T_3$ which rotates $U_1$, $U_2$, $U_3$ into $W_1$, $W_2$, $W_3$; and generating a transformed point from said transformation vector and a representative point of said part program; and replacing said representative point with said transformed point such the part program will control movements of the machine according to the orientation of the actual surface in the coordinate system of the machine.

7. A method as defined in claim 6 wherein the step of generating a transformed point further includes the step of:

translating the representative point from the representative origin to the actual origin.

* * * * *

UNITED STATES PATENT AND TRADEMARK OFFICE
CERTIFICATE OF CORRECTION

PATENT NO. : 5,117,348

DATED : May 26, 1992

INVENTOR(S) : Jorge E. ROMERO et al.

It is certified that error appears in the above-identified patent and that said Letters Patent is hereby corrected as shown below:

Column 1, line 57, change "layed" to --laid--.

Column 4, line 35, after "for" delete "the".

Column 4, line 62, change "a" to --an--.

Column 5, line 5, change "peripherial" to --peripheral--.

Column 5, line 63, change "Y axis" to --Y-axis--.

Column 6, line 37, change "line" to --point--.

Column 10, line 21, change "layed" to --laid--.

Column 10, line 27, after "an" delete "a".

Column 10, line 31, after "of" (first occurrence) insert --a--.

Column 10, line 34, change "causes" to --effects--.

Column 13, line 5, after "the" delete "an".

Column 13, line 20, change "a" to --an--.

Column 14, line 19, delete "402".

Column 15, line 12, after "description" insert --of--.

Column 16, line 6, change "chosing" to --choosing--.

Column 16, line 21, change "$P_1$" to --$P_1'$--.

UNITED STATES PATENT AND TRADEMARK OFFICE
CERTIFICATE OF CORRECTION

PATENT NO. : 5,117,348

DATED : May 26, 1992

INVENTOR(S) : Jorge E. ROMERO et al.

It is certified that error appears in the above-identified patent and that said Letters Patent is hereby corrected as shown below:

Column 17, line 12, change "$U^5$" to --$U^T$--.

IN THE CLAIMS:

Col. 18, line 42, change "area" to --are--

Column 20, line 15, after "such" insert --that-- .

Signed and Sealed this

Twenty-fourth Day of August, 1993

Attest:

BRUCE LEHMAN

Attesting Officer

Commissioner of Patents and Trademarks